United States Patent
Zhao et al.

(10) Patent No.: US 9,394,889 B2
(45) Date of Patent: Jul. 19, 2016

(54) CHEMICAL-ELECTROMAGNETIC HYBRID PROPELLER WITH VARIABLE SPECIFIC IMPULSE

(71) Applicant: Beijing Institute of Spacecraft Enviroment Engineering, Beijing (CN)

(72) Inventors: Hua Zhao, Beijing (CN); Zhong Yi, Beijing (CN); Yuming Liu, Beijing (CN); Yenan Liu, Beijing (CN); Lifei Meng, Beijing (CN); Chao Zhang, Beijing (CN); Qi Xiao, Beijing (CN); Jipeng Sun, Beijing (CN); Yanlin Xu, Beijing (CN)

(73) Assignee: Beijing Institute of Spacecraft Environment Engineering, Beijing (CN)

( * ) Notice: Subject to any disclaimer, the term of this patent is extended or adjusted under 35 U.S.C. 154(b) by 13 days.

(21) Appl. No.: 14/403,101

(22) PCT Filed: May 7, 2013

(86) PCT No.: PCT/CN2013/075271
§ 371 (c)(1),
(2) Date: Nov. 21, 2014

(87) PCT Pub. No.: WO2013/174211
PCT Pub. Date: Nov. 28, 2013

(65) Prior Publication Data
US 2015/0107219 A1    Apr. 23, 2015

(30) Foreign Application Priority Data

May 22, 2012   (CN) .......................... 2012 1 0159721
Aug. 1, 2012   (CN) .......................... 2012 1 0270030

(51) Int. Cl.
*F03H 1/00* (2006.01)
*F02K 9/42* (2006.01)
*F02K 99/00* (2009.01)
*F02K 9/76* (2006.01)

(52) U.S. Cl.
CPC ................ *F03H 1/0081* (2013.01); *F02K 9/42* (2013.01); *F02K 9/76* (2013.01); *F02K 99/00* (2013.01); *F03H 1/0012* (2013.01); *F03H 1/0093* (2013.01)

(58) Field of Classification Search
CPC ....... F03H 1/0081; F03H 1/0093; F03H 1/00; F03H 1/0006; F03H 1/0012; F03H 1/0037; F03H 1/0056; F03H 1/0062; F03H 1/0087; F03H 99/00
See application file for complete search history.

(56) References Cited

U.S. PATENT DOCUMENTS 5,170,623 A * 12/1992 Dailey ...................... F02K 9/74
                                                       60/202
8,624,502 B2 * 1/2014 Rosenthal ............... H01J 27/18
                                                       250/423 R (Continued)

FOREIGN PATENT DOCUMENTS

CN       1761816 A     4/2006
JP    2008 223655 A    9/2008

OTHER PUBLICATIONS

Reed, Brian D., "On-Board Chemical Propulsion Technology," NASA TM-2004-212698, Apr. 2004, covers w/pp. 1-12, plus Report Documentation Page.

(Continued)

*Primary Examiner* — Phutthiwat Wongwian
*Assistant Examiner* — William Breazeal
(74) *Attorney, Agent, or Firm* — D. Peter Hochberg; Sean F. Mellino

(57) ABSTRACT

A chemical-electromagnetic hybrid propeller with variable specific impulse. Fuel gas ejected out from a spraying tube of the chemical propeller through chemical propulsion enters an ionization chamber through a first magnetic mirror tube for ionization. The fuel gas after ionization is heated up by radio-frequency ion cyclotron waves in an ion cyclotron wave heating chamber so as to improve the kinetic energy. Then a second magnetic mirror tube is used, so that ions in the fuel gas after the ionization are heated up many times in a reciprocating manner between the magnetic mirror tubes, and ejected to generate forward propulsion force. By means of the propeller, the propulsion force and the specific impulse are greatly increased.

5 Claims, 1 Drawing Sheet

(56) References Cited

U.S. PATENT DOCUMENTS

2008/0093506 A1 4/2008 Emsellem et al.
2013/0067883 A1* 3/2013 Emsellem ............ F03H 1/0081
60/202

OTHER PUBLICATIONS

Gulczinski, Frank S., et al.,"In-Space Propulsion," AIAA/ICAS Int'l Air and Space Symposium and Expostion, The Next 100 Y, AIAA 2003-2588, pp. 1-26, Jul. 14-17, 2003.

Sackheim, Robert L., "Overview of United States Space Propulsion Technology and Associated Transportation Systems," J. of Propulsion and Power, vol. 22, No. 6, Nov.-Dec. 2006.

Wilson, Fred C., "Recent Advances in Satellite Propulsion and Associated Mission Benefits," AIAA 2006-5306, AIAA Int'l Communications Satellite System Conf., Jun. 12-14, 2006.

Accettura, A.G., et al., "Advanced Propulsion Systems: Mission Scenarios, Critical Overview and Key Technologies for New Demands," AIAA 01-34247, Jul. 8-11, 2001, pp. 1-11.

Liu Chang-Guo, et al.; Research on the High Specific Impulse Bipropellant Liquid Apogee Engine; Shanghai Institute of Space Propulsion, Shanghai 200233; vol. 4 (2003) (p. 1-10).

* cited by examiner

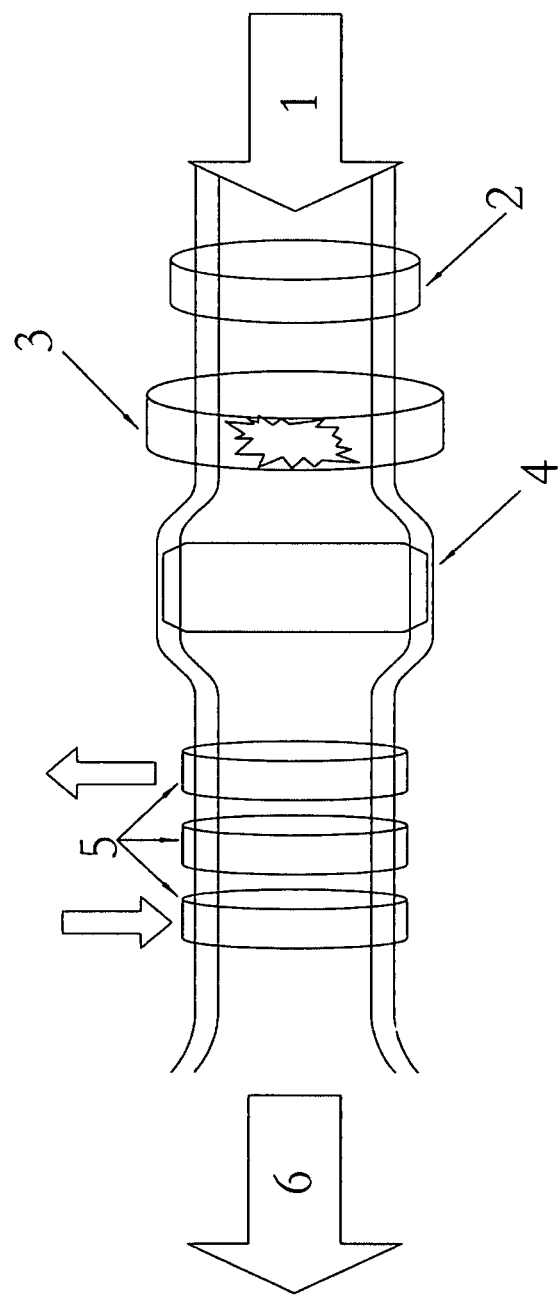

CHEMICAL-ELECTROMAGNETIC HYBRID PROPELLER WITH VARIABLE SPECIFIC IMPULSE

CROSS-REFERENCE TO RELATED APPLICATIONS

This application is a National Stage application of International Application No. PCT/CN2013/075271 filed on May 7, 2013, which claims priority of Chinese application Serial Number 201210270030.5, filed on Aug. 1, 2012 and Chinese application Serial Number 201210159721.8, filed on May 22, 2012, all of which are incorporated herein by reference in their entireties.

BACKGROUND OF THE INVENTION

1. Field of the Invention

The invention relates to the field of the propulsion of the spacecraft and the use of space environment. More particularly, the present invention relates to a variable specific impulse chemical-electromagnetic hybrid propeller based on a combination of chemical propulsion and electric propulsion methods.

2. Description of the Prior Art

Space propulsion is used during the period after the spacecraft has launched. Its function is to provide power to the mission of the spacecraft orbit transfer, state remaining, high-precision directing, orbit maneuver or the like.

The propulsion technique can be generally divided into chemical propulsion and electric propulsion, as well as some other propulsion techniques (such as solar sail, tethered propulsion, micro-magnetosphere propulsion or the like). At present, the main propeller of the most spacecraft adopts chemical propulsion. But the electric propulsion as an advanced propulsion technique is getting more and more attention.

Chemical propulsion is a propulsion technique using chemical energy to send the spacecraft into the reserved space course and realize the orbit maneuver. The most prominent feature of chemical propulsion is to provide high-thrust, has been the most used technique in the space field. The chemical engine is used in the present long-life tri-axial attitude control stabilized satellite and spin satellite as a controlling and executing assembly. The chemical propulsion technique is the most mature and used propulsion technique. However, with great development of the range and depth the human use and explore outer space, the chemical propulsion cannot satisfy the demand of future space missions. The biggest shortcoming of chemical propulsion is the low energy density and low specific impulse. The specific impulse of the single-unit chemical propeller is only about 200s, the specific impulse of the double-units chemical propeller is only about 325s, and which approach the limit of the chemical propulsion technique (Reference 1: Reed, Brian D. "On-Board Chemical Propulsion Technology," NASA TM-2004-212698; Reference 2: Gulczinski F. In-Space Propulsion. AIAA-2003-2588; Reference 3: Sackheim R. Overview of United States Space Propulsion Technology and Associated Space Transportation Systems. Journal of Propulsion and Power. Vol. 22, No. 6, 2006; Reference 4: Wilson F. Recent Advances in Satellite Propulsion and Associated Mission Benefits. AIAA-2006-5306). Because of the low energy density and low specific impulse, the chemical propeller must carry a great amount of fuel, resulting in the huge weight and low reliability of the spacecraft system. The chemical propulsion cannot satisfy the demand of spacecraft mission, such as orbit maneuver, long-lifetime working and deep space exploration.

Electric propulsion provides energy to the propellant using the electricity generated and produced by the solar panel and nuclear reactor, to make the propellant producing the jet velocity far more than the common chemical propeller. The specific impulse of the electric propeller is high and can reach 1000s-80000s (based on the variable working theory), reduce the system quality, save the propellant, and improve the working-life of the spacecraft. Besides applying in the long-life communication satellite to improve the performance of the satellite platform, the electric propulsion can complete the tasks which the common propulsion system is unable to do. So the electric propeller is the important developing trend of the propulsion technique at home and abroad, which is gradually replacing a part of the chemical propeller. The shortcoming of the electric propulsion is the low propulsion force, the propulsion force of the common electric propeller about kw power is at about millinewton level, which is not suitable for executing the mission that needs high speed value such as orbit maneuver (Reference 9: A. G. Accettura, et. al. Advanced Propulsion Systems: Mission Scenarios, Critical Overview, and Key Technologies for New Demands, AIAA 2001-3517, 2001; 10 Advanced Propulsion Concepts, NASA JPL, 1989), which greatly restricts the future applying range of electric propulsion.

The important developing trend of the spacecraft at home and abroad is long-time in orbit, high-speed maneuver. Long-time in orbit needs the longer life-time of the spacecraft, and high-speed maneuver needs the spacecraft to be more agile and high ability of orbit transfer. To achieve the two goals, firstly it needs to improve the level of the space propulsion technique. The working-life of the propulsion system is a necessary factor to determine the working-life of the spacecraft. When the propeller is stopped, so does the satellite. Improving the specific impulse of the propeller can reduce the fuel consumption of the propeller, with the same fuel amount, high specific impulse propeller can work longer, and prolong the spacecraft life. The high speed maneuver spacecraft needs high speed value, such as large propulsion force, to achieve the orbit transfer quickly. At present, the chemical propulsion and electric propulsion can separately satisfy one of the factors and cannot simultaneously achieve large propulsion force and high specific impulse.

The invention provides the chemical-electromagnetic hybrid propulsion technique, combining the chemical propulsion and electric propulsion, and has the merit of the large propulsion force and high specific impulse, conquer the shortcoming of the two. It can be applied globally at variable spacecraft.

SUMMARY OF THE INVENTION

So, to solve the fore-mentioned technical problem, using the chemical-electromagnetic hybrid mode and combining the chemical propulsion and electric propulsion, the invention provides a chemical-electromagnetic hybrid propeller with variable specific impulse, the propeller further ionizes and accelerates to reduce the jet gas fuel based on the chemical propulsion, so as to improve the propulsion force and specific impulse of the propeller.

The invention adopts the following technical scheme:

A chemical-electromagnetic hybrid propeller with variable specific impulse, comprises a chemical propeller, a double-magnetic mirror tube, an ionization chamber and an ion cyclotron wave heating chamber. A first magnetic mirror tube is connected on the rear end of the spraying tube of the chemical propeller in a sealing way, the other end of the first magnetic mirror tube is connected with the ion cyclotron wave heating chamber by the ionization chamber in a sealing way, and the other end of the ion cyclotron wave heating chamber is connected with a second magnetic tube in a sealing way. Fuel gas ejected out from the spraying tube of the chemical propeller through chemical propulsion enters the ionization chamber through the first magnetic mirror tube for ionization. The fuel gas after ionization is heated up by radio-frequency ion cyclotron waves in the ion cyclotron wave heating chamber so as to improve kinetic energy. The second magnetic mirror tube is used so that ions in the fuel gas after the ionization are heated up many times in a reciprocating manner between the magnetic mirror tubes, and plasma jet flame is ejected to generate forward propulsion force. The first magnetic mirror tube is a permanent magnet, and the second magnetic mirror tube is a solenoid coil.

In the context, the permanent magnet is a neodymium iron boron permanent magnet, samarium cobalt magnet, aluminum-nickel-cobalt magnet or ferrite magnet.

In the context, the fuel gas produced from chemical propulsion is ionized in the ionization chamber through the ultraviolet light source or spiral wave discharge mode.

In the context, the solenoid coil adjusts the magnetic mirror ratio of magnetic mirror through controlling the size of the current.

In the context, the radio-frequency ion cyclotron waves heating antenna is arranged in the ion cyclotron wave heating chamber.

Compared with traditional electric propulsion, the chemical-electromagnetic hybrid propulsion technique makes the chemical propellant to form the plasma by the ultraviolet light ionizing or the spiral wave discharging. The plasma is restricted by the magnetic mirror configuration in the magnetic mirror tube and ions are heated many times by the ion cyclotron wave. When the ion restriction at the end of the outlet is open, most of the energy of the ions is transferred to the kinetic energy in the parallel direction. It is the new application of the magnet restriction plasma magnetic mirror technique in the plasma propulsion technique. In theory, the hybrid propulsion force is more than twice that of the chemical propeller. The most merit of the hybrid propeller is that the propulsion force and specific impulse of the propeller are greatly increased without adding a propellant. Simultaneously, the propeller further has the capacity for continuously adjusting the propulsion force, and is particularly suitable for minor planet landing control of a spacecraft.

BRIEF DESCRIPTION OF DRAWINGS

FIG. 1 illustrates a schematic view of a chemical-electromagnetic hybrid propeller with variable specific impulse of the invention.

Referring to FIG. 1: 1—the gas fuel from the chemical propulsion; 2—the permanent magnet; 3—an ionization chamber; 4—the ion cyclotron wave heating chamber; 5—solenoid coil; 6—the plasma jet flame.

DETAILED DESCRIPTION OF EMBODIMENTS OF THE INVENTION

Embodiments of the chemical-electromagnetic hybrid propeller with variable specific impulse of the invention now will be described more fully hereinafter with reference to the accompanying drawings, these embodiments are provided for example, the scope of the invention should not be constructed as limited to the embodiments.

FIG. 1 illustrates a schematic view of a chemical-electromagnetic hybrid propeller with variable specific impulse of the invention, wherein, a chemical-electromagnetic hybrid propeller with variable specific impulse of the invention, comprises a chemical propeller, a double-magnetic mirror tube (the first magnetic mirror tube, the second magnetic mirror tube), an ionization chamber and an ion cyclotron wave heating chamber, wherein a first magnetic mirror tube, such as the permanent magnet 2, is connected on the rear end of the spraying tube of the chemical propeller in a sealing way, the other end of the first magnetic mirror tube is connected with the ion cyclotron wave heating chamber 4 by the ionization chamber 3 in a sealing way, and the other end of the ion cyclotron wave heating chamber 4 is connected with a second magnetic tube (such as the solenoid coil 5) in a sealing way. Fuel gas 1 ejected out from the spraying tube of the chemical propeller through chemical propulsion enters the ionization chamber 3 through the first magnetic mirror tube for ionization. Preferably, the fuel gas produced from chemical propulsion is ionized through the ultraviolet light source or spiral wave discharge mode. The fuel gas after ionization is heated up by the radio-frequency ion cyclotron waves heating antenna in the ion cyclotron wave heating chamber 4 so as to improve kinetic energy. The second magnetic mirror tube (such as the solenoid coil 5) is used so that ions in the fuel gas after the ionization are heated up many times in a reciprocating manner between the magnetic mirror tubes, and plasma jet flame 6 is ejected to generate forward propulsion force. The first magnetic mirror tube is a permanent magnet, wherein, the permanent magnet is a neodymium iron boron permanent magnet, samarium cobalt magnet, aluminum-nickel-cobalt magnet or ferrite magnet. The second magnetic mirror tube is a solenoid coil. The solenoid coil adjusts the magnetic mirror ratio of magnetic mirror through controlling the size of the current.

In one embodiment, the device behind the spraying tube of the chemical propeller of the chemical-electromagnetic hybrid propeller of the invention, is a double-magnetic mirror tube formed by the permanent magnet 2 and solenoid coil 5. The permanent magnet 2 is a neodymium iron boron permanent magnet, working without energy. In the ionization chamber 3 behind the permanent magnet 2, the fuel gas produced from chemical propulsion is ionized through the ultraviolet light source way, to form the dense ions. The solenoid coil adjusts the magnetic mirror ratio of magnetic mirror through controlling the size of the current. Between the double-magnetic mirror is the ion cyclotron wave heating chamber 4, the radio-frequency ion cyclotron waves heating antenna arranged inside it, the gas fuel after ionization produced from chemical propulsion is heated up by the ion cyclotron wave. As the restriction of the magnetic mirror of the solenoid coil, the ions are heated up to a high energy many times in a reciprocating manner, by breaking the current of the solenoid coil 5, the function of the magnetic mirror of the solenoid coil is disappeared, the ions after heating ejects the plasma jet flame 6 to generate forward propulsion force. During the process, the ions after heating transfer the kinetic energy of vertical magnetic lines to that of parallel magnetic lines, greatly increases the speed in the direction of parallel spraying tube axis, so as to improve the parallel speed of the chemical propellant ejected and improve the propulsion force and specific impulse of the propeller.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A chemical-electromagnetic hybrid propeller with variable specific impulse, comprising:
   a chemical propeller having a spraying tube, the chemical propeller configured to generate a propulsive force derived from a chemical energy of a fuel;
   a first magnetic mirror tube and a second magnetic mirror tubes;
   an ionization chamber; and
   an ion cyclotron wave heating chamber, wherein the first magnetic mirror tube is connected on a downstream end of the spraying tube of the chemical propeller in a sealing way, a downstream end of the first magnetic mirror tube is connected with the ion cyclotron wave heating chamber by the ionization chamber in a sealing way, and a downstream end of the ion cyclotron wave heating chamber is connected with the second magnetic tube in a sealing way, wherein fuel gas ejected out from the spraying tube of the chemical propeller through chemical propulsion enters the ionization chamber through the first magnetic mirror tube for ionization, the fuel gas after ionization is heated up by radio-frequency ion cyclotron waves in the ion cyclotron wave heating chamber for improving a kinetic energy of the fuel gas, the second magnetic mirror tube is used so that ions in the fuel gas after ionization can be heated up many times in a reciprocating manner between the first magnetic mirror tube and the second magnetic mirror tube, and a plasma jet frame is ejected to generate forward propulsion force, wherein the first magnetic mirror tube is a permanent magnet, and the second magnetic mirror tube is a solenoid coil.

2. The chemical-electromagnetic hybrid propeller with variable specific impulse according to claim 1, wherein the permanent magnet is selected from a group consisting of a neodymium iron boron permanent magnet, a samarium cobalt magnet, an aluminum-nickel-cobalt magnet and a ferrite magnet.

3. The chemical-electromagnetic hybrid propeller with variable specific impulse according to claim 1, wherein the fuel gas produced from chemical propulsion is ionized in the ionization chamber through an ultraviolet light source or a spiral wave discharge mode.

4. The chemical-electromagnetic hybrid propeller with variable specific impulse according to claim 1, wherein the solenoid coil adjusts a relative magnetic field strength between the first magnetic mirror tube and the second magnetic mirror tube through controlling a size of a solenoid current.

5. The chemical-electromagnetic hybrid propeller with variable specific impulse according to claim 1, wherein an radio-frequency ion cyclotron wave heating antenna is arranged in the ion cyclotron wave heating chamber.

* * * * *